United States Patent [19]

Kimberlin

[11] Patent Number: 4,509,386
[45] Date of Patent: Apr. 9, 1985

[54] LASH-FREE TELESCOPIC STEERING SHAFT ASSEMBLY AND METHOD OF MAKING THE ASSEMBLY

[75] Inventor: Dan R. Kimberlin, Frankenmuth, Mich.

[73] Assignee: General Motors Corporation, Detroit, Mich.

[21] Appl. No.: 441,498

[22] Filed: Nov. 15, 1982

[51] Int. Cl.³ ............... B62D 1/18; F16D 3/06; B21D 53/10
[52] U.S. Cl. ............... 74/492; 29/148.4 A; 29/437; 29/445; 188/371; 308/6 R; 403/359; 464/167
[58] Field of Search ............... 74/492, 493; 29/148.4 A, 434, 437, 445; 280/777; 464/167, 178; 308/6 R; 403/109, 359; 188/371

[56] References Cited

U.S. PATENT DOCUMENTS

| | | | |
|---|---|---|---|
| 3,392,599 | 7/1968 | White | 74/492 |
| 3,521,341 | 7/1970 | Hornlein et al. | 29/434 X |
| 3,538,783 | 11/1970 | Butts | 74/492 |
| 3,604,285 | 9/1971 | Olsson | 74/492 |
| 3,670,591 | 6/1972 | Milton | 74/492 |
| 3,698,259 | 10/1972 | Reeves | 74/492 |
| 3,788,148 | 7/1972 | Connell et al. | 74/492 |
| 3,884,051 | 5/1975 | Bottoms | 403/359 X |
| 4,142,423 | 3/1979 | Ikawa | 74/492 |

FOREIGN PATENT DOCUMENTS

| | | | |
|---|---|---|---|
| 2051777 | 4/1972 | Fed. Rep. of Germany . | |
| 837959 | 6/1960 | United Kingdom | 403/109 |
| 1164146 | 9/1969 | United Kingdom . | |

*Primary Examiner*—Allan D. Herrmann
*Attorney, Agent, or Firm*—Charles R. White

[57] ABSTRACT

A collapsible steering shaft assembly incorporating a slide with deforming balls that roll tracks in telescopic shaft members so that the shafts are positively interconnected in a rotational sense and which roll in said tracks to permit relative sliding of said shaft on application of low axial load.

5 Claims, 6 Drawing Figures

LASH-FREE TELESCOPIC STEERING SHAFT ASSEMBLY AND METHOD OF MAKING THE ASSEMBLY

This invention relates to vehicle steering and more particularly to steering shaft assemblies featuring a new and improved non-frangible sliding connection between the inner and outer steering shafts which transmits steering torque without lash and which permits the shaft to telescope together under predetermined load conditions. This invention also relates to a new and improved method of making the lash-free telescoping shaft assembly.

In many vehicle steering column assemblies it is common practice to incorporate a steering shaft assembly with telescopically arranged inner and outer steering shafts that are releasably joined together by shear keys which transmit steering torques and which are sheared under predetermined axial load to permit shaft stroking or collapse with other components of the steering column assembly. Reduction of steering shaft lash generally requires the tedious and expensive molding of plastic shear keys in place or the custom selection of special keys for making the connection. After the keys are sheared by an impact the inner and outer steering shafts can be repositioned and new shear keys may be installed after the removal of the severed keys or the steering shaft assembly can be replaced by a new assembly when the column is replaced.

The preferred embodiment of the present invention is drawn to a new and improved steering shaft assembly which does not require shear keys or any frangible elements and which provides low load stroking. In contrast to many prior constructions, this invention provides for built-in lash-free turning of the steering shaft assembly. The steering shaft assembly according to this invention includes a solid inner steering shaft operatively connected to the vehicle steering wheel. The inner steering shaft is telescopically received in a tubular outer steering shaft which is operatively coupled to the vehicle steering gear. Special guide and ball assemblies are mounted in flat bottomed pockets on opposite sides of the inner steering shaft and have interference fit between the inner and outer steering shafts to provide for lash-free turning of the steering shaft assembly and for the low load stroking of the steering shaft assembly in the event of predetermined load being applied to the steering column.

Each guide and ball assembly is preferably made from a flat plastic carrier plate having two parallel rows of holes formed therein. Steel balls having a diameter greater than the thickness of the carrier plate are press fitted into the holes and are retained at their diameters therein for subsequent rolling action between the two telescopic steering shafts. Since the steel balls have a slight interference fit between the flat inner wall of the outer steering shaft and the flat bottom of the pocket, parallel linear tracks or furrows are formed in the inner and outer steering shaft as the assembly is stroked through its total travel and returned to an initial position at least once. With the deforming balls in the tracks which they have made, the inner and outer steering shafts are rigidly connected in a rotational or turning sense for no-lash steering. Since the balls make their own tracks, the connection is customized for each steering shaft assembly. Furthermore, with the rolling ball and linear track connection a low effort no-lash stroking is provided in the event that the steering column is impact loaded to a point causing its collapse. After being stroked in an impact situation, the steering shaft assembly can be returned to its original outwardly telescoped position for subsequent stroking movement without having to replace or rebuild break-away components as in many prior constructions.

It is a feature, object and advantage of this invention to provide a new and improved lash-free steering shaft with low load axial slip incorporating a sliding guide and deforming ball assembly interposed between inner and outer steering shafts so that the balls roll in self-made tracks during stroking movement and serve to rigidly interconnect the inner and outer steering shafts for rotation together to permit the lash-free turning of the steering shaft assembly.

It is another feature, object and advantage of this invention to provide a new and improved method of making a lash-free steering shaft assembly in which shaft members are telescopically stroked and returned to an initial position so that deforming devices interposed between the members form tracks allowing the shaft assembly to be subsequently linearly stroked under predetermined axial load conditions with the deforming members sliding in the track and with shaft members being rigidly interconnected from a rotational standpoint for steering purposes by the deforming members in conjunction with the track.

These and other features, objects and advantages of this invention will become more apparent from the following detailed description and drawings in which.

Figure 1:
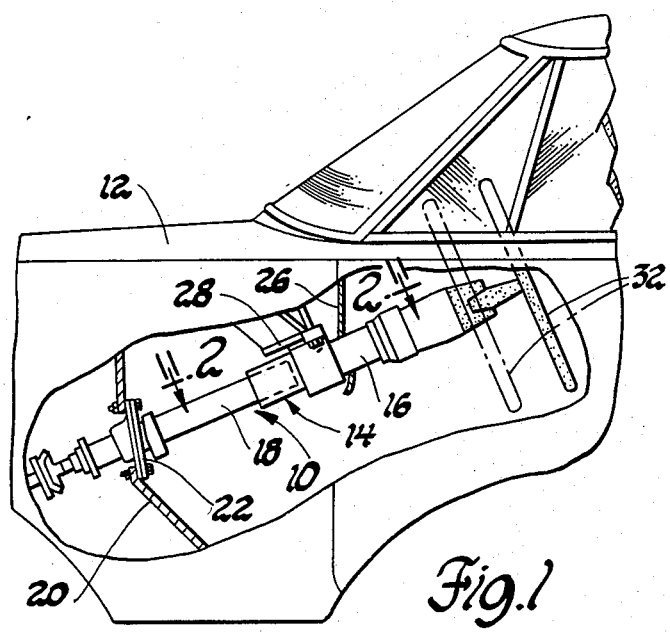
FIG. 1 is a side elevational view of a vehicle with a cutaway section showing a steering column assembly in which is incorporated the telescopic steering shaft assembly of the present invention.

Referring now in greater detail to the drawings, FIG. 1 illustrates an energy absorbing steering column assembly 10 operatively mounted in a vehicle body 12. The steering column assembly 10 includes a mast jacket 14 having upper and lower telescopically arranged cylindrical metallic tubes 16, 18 interconnected by hardened steel balls 19 which can deform portions of the tubes when telescoped together to operate as energy absorbers. The lower tube 18 of mast jacket 14 is mounted adjacent to its lower end to a front bulkhead 20 by a first bracket assembly 22 while the upper cylindrical tube 16 is releasably connected to the vehicle body instrument panel structure 26 by second bracket assembly 28. Preferably the first bracket assembly 22 connects the lower tube of the jacket assembly to the front bulkhead so that the lower tube will not move relative thereto in either axial direction while the bracket assembly 28, connected to the instrument panel structure by releasable capsules 29, permits the forward displacement of upper tube 16 under predetermined load conditions. Furthermore, bracket assembly 28 and capsules 29 inhibit the rearward displacement of the tube relative to the instrument support panel 26.

The mast jacket 14 rotatably supports and houses a collapsible steering shaft assembly 30 extending from operative connection with the steering wheel 32 through the cylindrical tubes 16, 18 for connection at the other side of forward bulkhead 20 with conventional steering gear for steering the front wheels of the vehicle.

Figure 3:
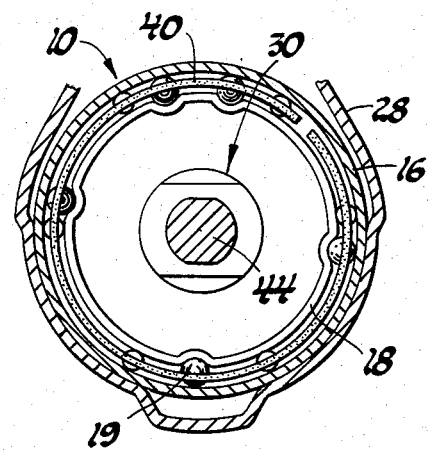
FIG. 3 is a cross-sectional view taken along lines 3—3 of FIG. 2.
Figure 2:
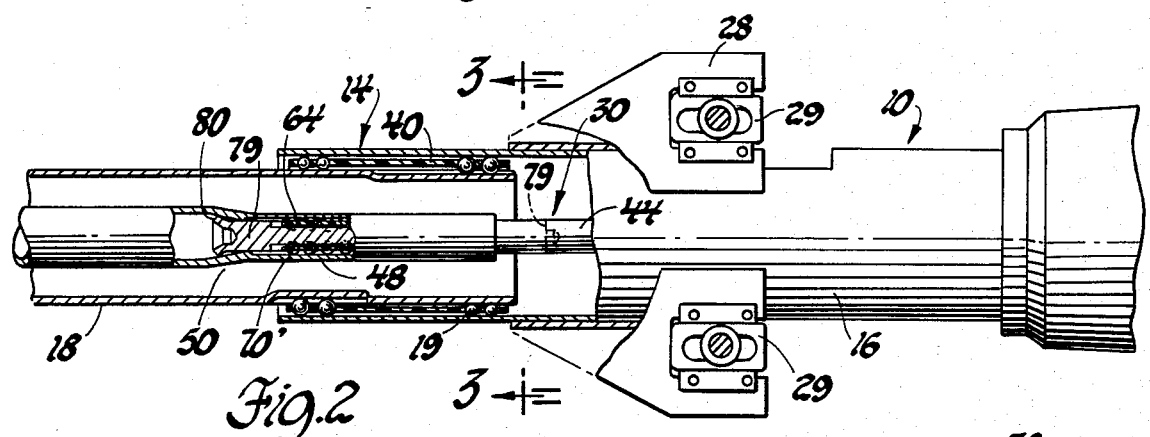
FIG. 2 is an enlarged cross-sectional view taken generally along lines 2—2 of FIG. 1.

Referring to FIGS. 2 and 3, the energy absorbing construction present in the mast jacket 14 comprises annular rows of the deforming steel balls 19 mounted in a cylindrical sleeve 40 of nylon or other suitable plastic material. These balls have such a degree of interference fit between the telescoped ends of the upper and lower tubes 16 and 18 as to be operative through plastic strain to cause groove-like deformations in the engaged regions of the cylinders when they are caused to telescope together or collapse under predetermined impact loading applied to the steering wheel 32 moving it toward the dashed line position.

As will be seen in FIGS. 2 and 3, the balls are selected to be of such a size in relation to the diametrically measured annular space or gap between the upper and lower tubes 16, 18 as to be interferingly engaged between the interior and exterior surfaces of the tubes for the localized plastic deformation of the metal of the tubes in response to ball contact. When the steering column assembly is subjected to a predetermined and forwardly directed axial load, the upper tube 16 telescopes downwardly over the lower tube 18. On this telescoping movement the balls 19 roll in the same direction. The contact regions of the surfaces are deformed by the balls rolling extended grooves or furrows therein. The energy dissipated in this plastic deformation of the mast jacket tubes gradually brings the steering column collapse to a halt while effectively dissipating the impact energy imparted to the column.

To accommodate the telescopic and controlled collapse of the energy absorbing column, the steering shaft assembly 30 is provided with a special slidable interconnection which has a no-lash rotational fit for steering while allowing the telescopic collapse of the steering shaft assembly under low load conditions. The preferred embodiment of the steering shaft assembly 30 shown best in FIGS. 2 and 4 incorporates upper steering shaft 44 which has its upper end splined to or otherwise operatively connected to the steering wheel so that the steering shaft assembly can be turned by the steering wheel 32 for vehicle steering purposes. The upper steering shaft is a solid metal partially cylindrical bar which has its lower end telescopically received into the small dimensioned upper end section 48 of a tubular lower steering shaft 50.

Figure 4:
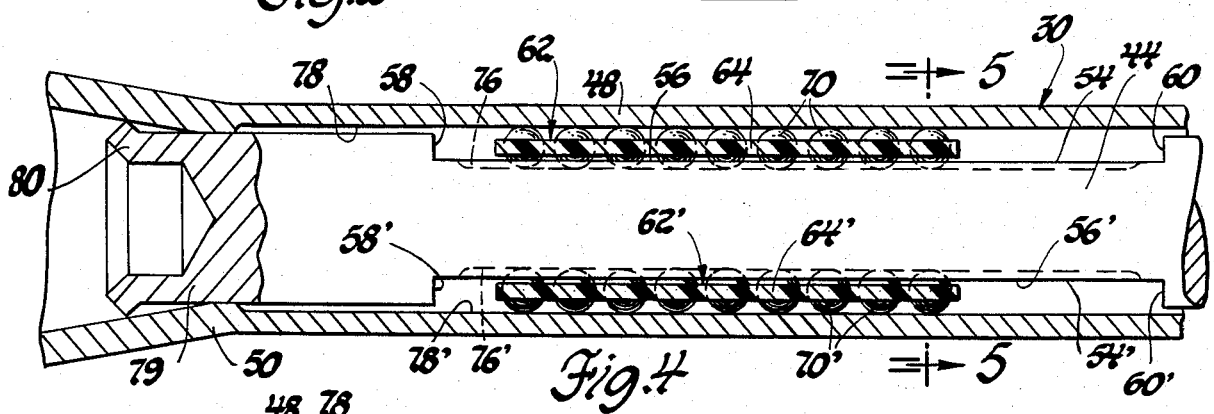
FIG. 4 is an enlarged view partially in cross-section of a portion of the telescopic steering shaft of FIG. 2.
Figure 5:
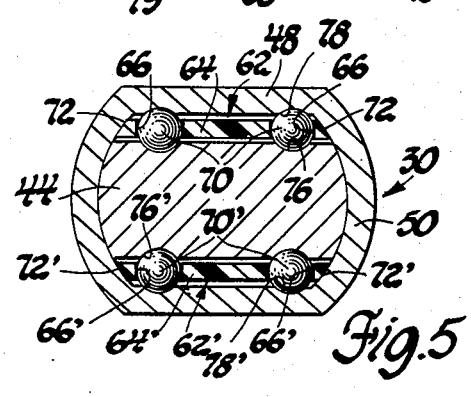
FIG. 5 is a cross-sectional view taken along lines 5—5 of FIG. 4.
Figure 6:
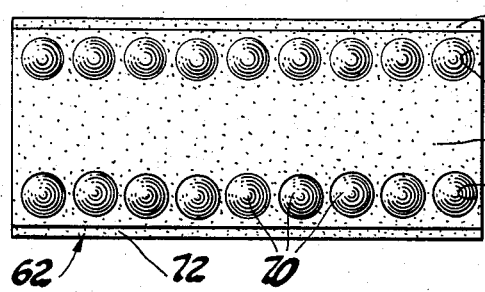
FIG. 6 is a top plan view of the ball and carrier assembly of this invention.

As best shown in FIGS. 2 and 4, opposite sides of the lower end of steering shaft 44 are formed with opposing recesses or pockets 54, 54'. Each recess has a flat bottom surface 56, 56' and end walls 58, 58', 60 and 60'. Received in each of these pockets 54, 54' is a ball and guide assembly 62, 62'. Each of these assemblies include a flat ball guide or plate 64, 64' of nylon or other suitable material having holes 66, 66' in longitudinally extending and parallel rows for receiving the steel balls 70, 70'.

The opposite sides 72, 72' of each of the ball guides 64, 64' contacts the inner side walls of the flattened end section 48 of the tubular steering shaft. With this side wall contact, the ball guides are guided in a linear path during stroking of the steering shafts. The diameter of the balls 70, 70' is slightly greater than the clearance between the bottom of the pocket and the opposing flat inner surface of the tubular steering shaft. For initial assembly the ball and guide assemblies 62, 62' are installed in their respective pockets 54, 54' and the inner steering shaft 44 is inserted into the outer tubular steering shaft 48 up to the ball guide assemblies 62, 62'. These two shafts are then stroked under axial load through a predetermined length of travel so that the balls roll parallel tracks 76, 76' in the flat bottom surfaces of the pocket of the inner shaft and parallel tracks 78, 78' in the flat interior wall of the outer shaft. After being stroked, the lower end 79 of the inner shaft is staked or outwardly flared at 80 so that it has a larger dimension than the upper end section 48 of the outer shaft to limit the outward telescopic movement as the shaft 44 is returned to a start or an initial position with the staked portions limiting the outer telescopic movement.

With this ball and mating track metal to metal connection the steering shaft components are much more rigid radially than the energy absorbing jacket and prior collapsible steering shaft assemblies. The formation of the tracks for each assembly provides for customized and individualized fits. This connection further allows low effort and no-lash stroking in the event of steering column collpase when an impact load of predetermined minimum magnitude is applied to the column to move the steering wheel to the dashed line position.

After the steering shaft assembly has been stroked in an impact situation, it can be readily returned to its original position; shear pins or any additional components are not needed to hold the two shaft members in position. If desired, the steering shaft assembly could be partially prestroked or not stroked at all so that the shaft assembly could serve as an energy absorbing construction to add to the energy absorbing capability of the column assembly.

The foregoing disclosure relates to a preferred embodiment and method of the invention which may be modified within the scope of the appended claims.

The embodiments of the invention in which an exclusive property or privilege is claimed are defined as follows:

1. An energy absorbing steering column collapsible in an energy absorbing mode of operation from an extended length to a collapsed length comprising a mast jacket assembly incorporating energy absorbing means therein, a steering shaft assembly operatively mounted within said mast jacket assembly, said steering shaft assembly having first and second shaft members mounted for relative telescopic sliding movement with respect to one another from an initial position to a shortened position when said column collapses in an energy absorbing mode of operation and rotatable as an assembly in a steering mode of operation said steering shaft assembly having ball means operatively interposed therein and operative in said energy absorbing mode of operation to move in linear track means in said first and second shaft members, said track means being directly formed in said first and second shaft members by said ball means when said steering shaft assembly is initially telescoped to said shortened position and returned to said initial position, said ball means being normally operative to drivingly interconnect said members for the transmission of steering torque with minimized lash in response to turning input to one of said steering shaft members.

2. An energy absorbing steering column collapsible in an energy absorbing mode of operation from an extended length to a collapsed length comprising a mast jacket assembly having tubular sections operatively interconnected by energy absorbing means, a composite steering shaft assembly operatively mounted within said mast jacket assembly, said steering shaft assembly having first and second shaft members mounted for telescopic movement with respect to one another when said column collapses in an energy absorbing mode of operation and rotatable as an assembly in a steering mode of operation, said steering shaft assembly having deformer ball means operatively interposed between said shaft members, said deformer ball means being operative to move in linear track means premade in said shaft members by said ball means when said steering shaft assembly is initially telescopically moved toward said collapsed position and then returned to said extended length, said ball and track means normally cooperating to drivingly interconnect said members for the transmission of steering torque with minimized lash in reponse to turning input to one of said steering shaft members.

3. An energy absorbing steering column collapsible in an energy absorbing mode of operation from an extended length to a collapsed length comprising a mast jacket assembly having upper and lower tubular sections operatively interconnected by energy absorbing means, a composite steering shaft assembly operatively mounted within said mast jacket assembly, said steering shaft assembly having first and second shaft members mounted for telescopic movement with respect to one another when said column collapses in an energy absorbing mode of operation and rotatable as an assembly in a steering mode of operation, a plurality of balls operatively interposed between said shaft members of said steering shaft assembly and operative to roll in a linear track previously made by said balls in at least one of said members when said steering shaft assembly is telescoped and operative to drivingly interconnect said members for the transmission of steering torque with minimized lash in response to turning steering input to one of said steering shaft members.

4. In an energy absorbing steering column collapsible in an energy absorbing mode of operation from an extended length to a collapsed length comprising in combination a mast jacket assembly having upper and lower sections, energy absorbing means operatively interconnecting said sections for movement to a collapsed position while absorbing energy in response to the application of predetermined load onto said column, a composite steering shaft assembly operatively mounted within said mast jacket assembly for turning movement for vehicle steering function and telescopic movement when said mast jacket sections are collapsed, said steering shaft assembly having a flattened first shaft member mounted for telescopic movement within a surrounding tubular second shaft member, said steering shaft assembly further having deformer ball means operatively interposed between said first and second shaft members, said deformer ball means being operative to move in linear track means preformed in both of said shaft members by said ball means when said steering shaft assembly is initially telescopically assembled together, said ball and track means being operative to transmit steering torque with minimized lash in a steering mode of operation for low effort stroking of said steering shaft assembly when said column is displaced to said collapsed length in the energy absorbing mode of operation.

5. A method of making a rotationally lash-free and telescopically collapsible vehicle steering shaft assembly having first and second telescopically oriented steering shaft members comprising the steps of providing an elongated pocket in a first of said shaft members, inserting deforming ball means in said pocket, inserting one of said shaft members within the other, telescopically stroking said shaft members from an initial position through a selected distance so that said ball means roll a track in said pocket and said second of said members, relatively moving said shaft member back toward said original position to drivingly interconnect said shafts for the transmission of steering torques with minimized lash and to allow the telescopic collapse of said shafts under predetermined axial load conditions.

* * * * *